INVENTORS
William J. Tell &
BY Jules A. Olivier
ATTORNEYS

May 29, 1956  J. A. OLIVIER ET AL  2,747,928
FOLDING TOP COMPARTMENT COVER
Filed Jan. 13, 1953  3 Sheets-Sheet 2
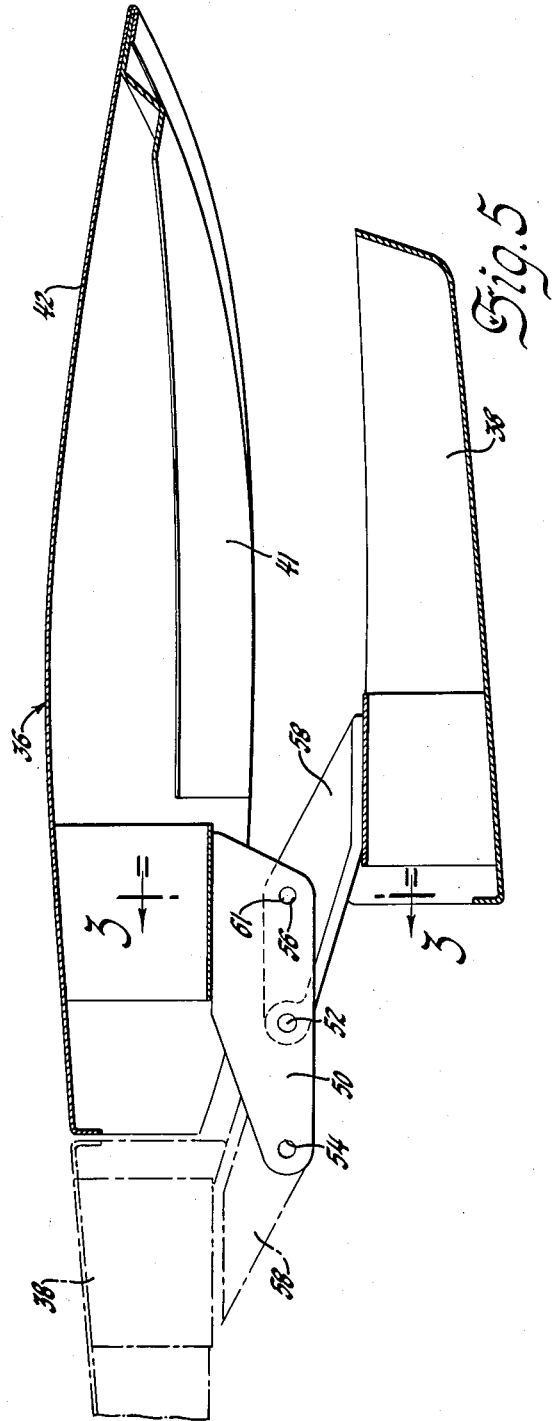
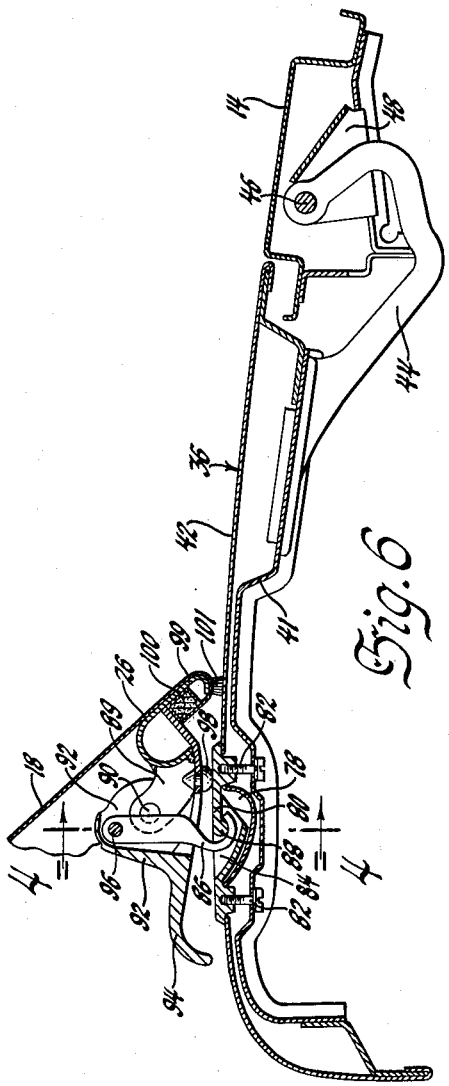
INVENTORS
*William J. Tell &*
BY *Jules A. Olivier*
ATTORNEYS

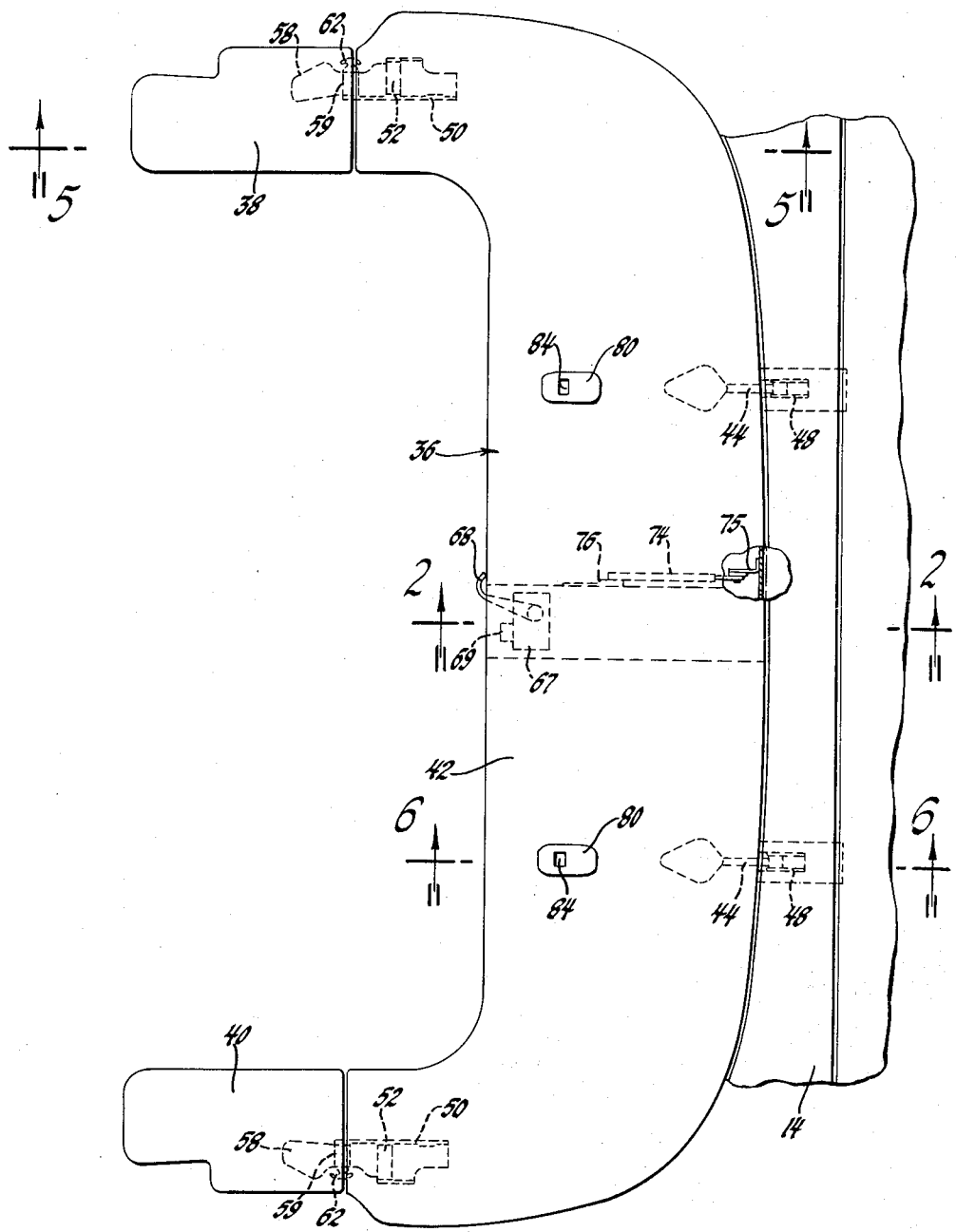

United States Patent Office 2,747,928
Patented May 29, 1956

2,747,928
FOLDING TOP COMPARTMENT COVER

Jules A. Olivier, Grosse Pointe Farms, and William J. Tell, Holly, Mich., assignors to General Motors Corporation, Detroit, Mich., a corporation of Delaware Application January 13, 1953, Serial No. 330,988

4 Claims. (Cl. 296—107)

This invention relates to a compartment cover, and more particularly to a hinged cover for closing an automobile body compartment in which a folding top is stored.

One feature of the invention is that it provides an improved compartment cover; another feature of the invention is that it provides a compartment cover comprising a main panel and oppositely disposed side panels hingedly connected to the main panel; a further feature of the invention is that means are provided for latching the rear bow of the automobile top to the compartment cover when the top is in raised position; still another feature of the invention is that the side panels form extensions of the main panel when in extended position to completely close the compartment, and said side panels underlie the main panel when in retracted position to provide an opening through which the top supporting struts may extend when the top is in raised position; and yet a further feature of the invention is that means are provided for latching the side panels in extended or retracted position.

Other features and advantages will be apparent from the following description and from the drawings, in which:

Fig. 5 is a section through the compartment cover taken along the line 5—5 of Fig. 7, the side panel being shown in retracted position in solid lines and being shown fragmentarily in extended position in broken lines;

Fig. 6 is a section through the compartment cover taken along the line 6—6 of Fig. 7;

Fig. 7 is a top plan view of the compartment cover showing the means by which the cover is hingedly mounted on the automobile body.

The invention is intended for use on an automobile having a folding top of the "disappearing" type wherein, when the top is folded, it is stored in a compartment and a cover is provided for the compartment so that when the top is folded, the automobile has the appearance of an open roadster without a top. The compartment cover preferably is metal and its lines blend with the automobile body lines so that when the top is folded and the cover is closed, the automobile appears not to be provided with a top.

Figure 1:
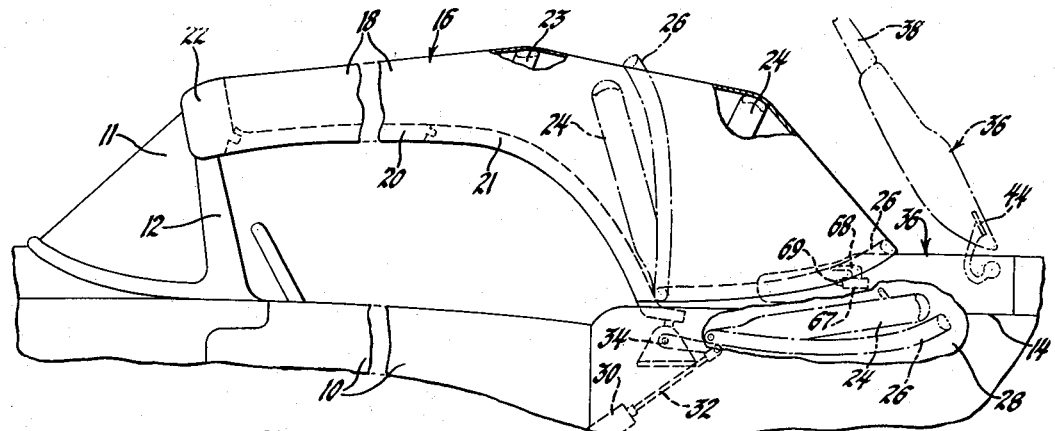
Fig. 1 is a fragmentary side elevational view of a convertible automobile having the improved top compartment cover, parts of the automobile being broken away to show underlying structure, and the cover being shown in closed position in solid lines and in open position in broken lines.

Referring now more particularly to the drawings, the convertible automobile illustrated in Fig. 1 has a body 10, a windshield 11 framed by a windshield header bar 12, a rear deck 14, and a foldable top designated generally at 16 and comprising flexible top material 18 (commonly of fabric) and a supporting frame. The supporting frame is formed from oppositely disposed side rails, each comprising a front section 20 hingedly connected to a rear section 21. The opposite side rails are interconnected by a plurality of transverse bows including a front bow 22, intermediate bows 23 and 24, and a rear bow 26.

The top collapses from the raised position shown in Fig. 1 to a folded position shown fragmentarily in said figure wherein the top is housed in a compartment 28. The top is moved between folded and raised position by power means which may include a conventional hydraulic piston and cylinder device 30 having a piston rod 32 which operates the top through a link 34. The mounting means and associated operating mechanisms for the top may be of conventional and well known construction and are not shown in detail in the drawings.

The compartment 28 is U-shaped in top plan view, the arms of the U accommodating the side rails 20, 21 and the side portions of the transverse bows 24 and 26 as shown in Fig. 1, and the base of the U accommodating the top material and the top portions of the bows 22, 23, 24 and 26. Closure means for this U-shaped compartment comprises a main panel 36 and side panels 38 and 40, the complete assembly being U-shaped in top plan view as shown in Fig. 7, and being adapted to close the compartment so that when the top is folded in the compartment, the automobile appears not to have a top.

The main panel 36 is formed of inner and outer walls 41 and 42 respectively of sheet metal, and the side panels are of similar construction, as shown in Fig. 5.

A pair of spaced hinges are provided along the rear side of the main panel 36 for hingedly mounting this panel onto the rear deck 14 of the automobile. As shown best in Fig. 6, these hinges are concealed and comprise gooseneck arms 44 which are rigidly mounted on the undersurface of the inner wall member 41 of the main panel and which are pivoted upon hinge pins 46 carried on support brackets 48 mounted on the automobile body beneath the surface of the rear deck 14.

The side panels 38 and 40 are hingedly mounted for pivotal movement between extended position wherein the side panels form extensions of the main panel (see Fig. 7) and retracted position wherein the side panels underlie the main panel (see Fig. 5). When the top is folded into the compartment 28, the side panels are latched in extended position, and when in this position the cover assembly, including main panel 36 and side panels 38 and 40, completely closes the compartment 28. When the top is in raised position as shown in Fig. 1, the side panels are latched in retracted position as illustrated in Fig. 5 wherein they underlie the main panel 36 to provide for small openings at each side of the automobile body forwardly of the main panel 36, and the top supporting struts comprising side rail section 21 and bows 24 and 26 project up through this opening.

Figure 3:
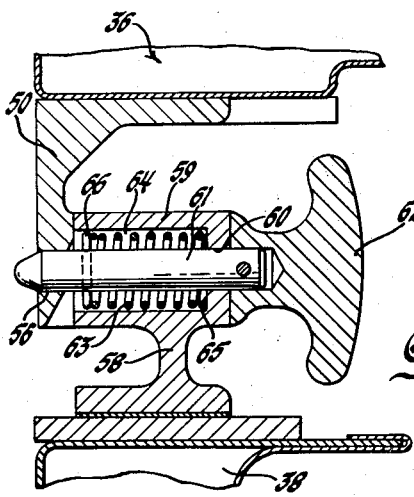
Fig. 3 is a section through the latching means for holding one of the side panels in extended or retracted position, taken along the line 3—3 of Fig. 5.

Means are provided for latching the side panels 38 and 40 in retracted position and in extended position, this means being shown in Figs. 3 and 5. Adjacent each end of the main panel 36 a hinge bracket 50 is mounted, this bracket carrying a hinge pin 52 intermediate its ends and having latching holes 54 and 56 adjacent its respective ends. A mounting bracket 58 is hingedly mounted at one of its ends on the hinge pin 52 and is affixed at its other end to the underside of each respective side panel 38 and 40 by welding or by any other conventional securing means. The mounting bracket 58 has a tubular portion 59 provided with a bore 60 through which extends a latching stud 61 having an operating knob 62 pinned to its end. As shown in Fig. 3, the bore 60 includes an enlarged chamber portion 64 in which is carried a coil spring 63, one end of the spring abutting a shoulder 65 forming an end wall for the enlarged chamber of the bore, and the other end of the spring abutting a pin 66 which projects through the latching stud 61, to provide a spring biased plunger type latch. As shown in Fig. 5, when the side plate 38 is pivoted to retracted position wherein it underlies the main panel 36, the plunger 61 enters the opening 56 in the hinge bracket 50 to hold the side panel 38 latched in retracted position, and when the side panel is pivoted to extended position as shown fragmentarily in broken lines in Fig. 5, the latch plunger enters the opening 54 in the hinge bracket 50 to hold the side panel latched in extended position wherein the side panel forms an extension of the main panel as illustrated in Fig. 7. As will be apparent from Figs. 3 and 5, in order to move each side panel between extended and retracted positions, it is only necessary to pull on the plunger knob 62 and pivot the side panel to its desired position.

Figure 2:
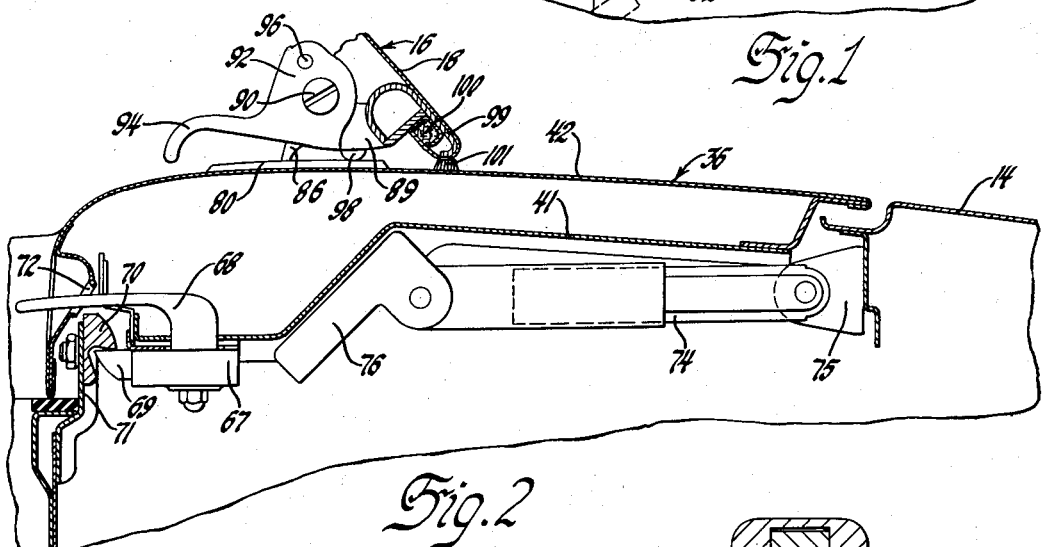
Fig. 2 is an enlarged section through the cover adjacent the center thereof taken along the line 2—2 of Fig. 7.

Means are illustrated in Fig. 2 for latching the main panel 36 in closed position, this means comprising a conventional latch 67 having a turn-handle 68 for operating a retractable bolt 69. The latch 67 is mounted on the underside of the wall member 41 of the main panel 36 adjacent the longitudinal center thereof near the front edge of the panel so that the forwardly projecting bolt 69 may engage a latch keeper 70 which is bolted to a support bracket 71 projecting upwardly from the automobile body. As shown in Fig. 2, the turn-handle 68 projects forwardly through an opening 72 in the front edge of the panel 36 so that the handle is operable from inside the automobile.

In order to hold the panel assembly in open position as illustrated in broken lines in Fig. 1, a telescoping strut 74 is provided. This strut is of conventional construction well known in the art, and therefore need not be described in detail. One arm of the strut is connected at its free end to a bracket 75 mounted beneath the rear deck 14 and the other arm of the strut is connected at its forward end to a bracket 76 mounted on the undersurface of the inner wall member 41 of the main panel 36.

Figure 4:
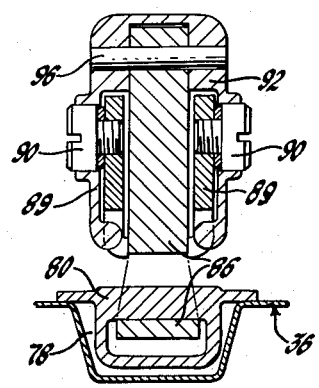
Fig. 4 is a section through the latch means for securing the top rear bow to the compartment cover, taken along the line 4—4 of Fig. 6.

When the top is in raised position the rear bow 26 rests on the upper surface of the panel assembly, and means are provided for latching the rear bow to the panel to insure against rattling and leakage. The main panel is provided with two spaced recesses 78 (Figs. 4 and 6) each covered by an escutcheon 80 which is secured by means of concealed screws 82 (Fig. 6). The escutcheon has an opening 84 into which projects a hook-shaped latch 86, the hook portion of the latch engaging a bead 88 on the underside of the escutcheon 80 adjacent the opening 84.

The latch mechanism is carried by the rear bow 26, a yoke 89 projecting forwardly from said bow and being pivoted by bolts 90 to a handle mechanism 92 having a finger grip portion 94. At a point spaced from the axis of the bolts 90 the upper end of the hook latch 86 is pivotally mounted on the handle 92 by means of a pin 96 so that the pivotal connection between the hook latch and the handle member is eccentric to the pivotal connection of the handle member on the rear bow 26, and movement of the handle member will free the hook latch from the bead 88 on the escutcheon 80.

A rubber button 98 is mounted on the undersurface of the yoke 89 and is adapted to engage the top surface of the escutcheon 80 to prevent the latch from marring the escutcheon surface, and, as shown in Figs. 2 and 6, means are provided for preventing leakage between the bow 26 and the panel assembly. The bow 26 is provided with a downwardly projecting extension 99 and the top material 18 is carried around this extension and secured to the bow by means of a conventional tacking strip 100. A conventional draft strip 101 on the top material 18 engages the upper surface of the panel assembly to provide a seal.

When it is desired to lower the folding top 16 from the raised position of Fig. 1 to a lowered position wherein the top is stored in the compartment 28 the latches which secure the rear bow 26 to the panel assembly are released and the rear bow is pivoted forward to an out of the way position as shown in broken lines in Fig. 1 so that the cover assembly can be opened as shown in broken lines in Fig. 1, the telescoping strut 74 operating to hold the cover assembly open. With the parts in this position, the top may be lowered by releasing the front bow 22 from engagement with the header bar 12 and actuating the power operating mechanism 30. When the top is folded into the compartment, the side panels may be moved from the retracted position shown in Fig. 5 to the extended position shown in Fig. 7 and the cover panel assembly may then be lowered to provide a closure for the compartment 28.

While we have shown and described one embodiment of our invention, it is capable of many modifications. Changes, therefore, in the construction and arrangement may be made without departing from the spirit and scope of the invention as set forth in the appended claims.

We claim:

1. Apparatus of the character described, including: an automobile body having a foldable top with supporting means and a compartment for storing said top and its supporting means when folded, the supporting means being pivotally mounted on the body within said compartment; closure means for said compartment comprising a main panel and oppositely disposed side panels; means hingedly connecting said main panel to said body; means hingedly connecting each side panel to said main panel for movement between extended and retracted positions; and means for latching said side panels in either of said positions, said panels completely covering said compartment when the side panels are extended and providing an opening through which said top supporting means may project when the side panels are retracted.

2. Apparatus of the character described, including: an automobile body having a foldable top with supporting means and a U-shaped compartment for storing said top and its supporting means when folded, the supporting means being pivotally mounted on the body within said compartment; U-shaped closure means for said compartment comprising a main panel and oppositely disposed side panels; means hingedly connecting said main panel to said body; means hingedly connecting each side panel to said main panel for pivotal movement between extended position wherein said side panels form extensions of said main panel and retracted position wherein said side panels underlie said main panel; and means for latching said side panels in either of said positions, said panels completely covering said compartment when the side panels are extended and providing an opening through which said top supporting means may project when the side panels are retracted.

3. Apparatus of the character described, including: an automobile body having a foldable top with supporting means and a U-shaped compartment for storing said top and its supporting means when folded, the supporting means being pivotally mounted on the body within said compartment; U-shaped closure means for said compartment comprising a main panel and oppositely disposed side panels; means hingedly connecting said main panel to said body; means for holding said main panel in open position to permit access into said compartment; means hingedly connecting each side panel to said main panel for pivotal movement between extended position wherein said side panels form extensions of said main panel and retracted position wherein said side panels underlie said main panel; and means for latching said side panels in either of said positions, said panels completely covering said compartment when the side panels are extended and providing an opening through which said top supporting means may project when the side panels are retracted.

4. Apparatus of the character described, including: an automobile body having a foldable top with supporting means including a hinged rear bow and a compartment for storing said top and bow when folded, said bow being pivotally mounted on the body within said compartment; closure means for said compartment comprising a main panel and oppositely disposed side panels; means at one side of said main panel hingedly connecting said main panel to said body; means at the opposite side of said main panel for latching said main panel to said body; latch means for securing said rear bow to said main panel when the top is in its extended position; means hingedly connecting each side panel to said main panel for pivotal movement between extended position wherein said side panels form extensions of said main panel and retracted position wherein said side panels underlie said main panel; and means for latching said side panels in either of said positions, said panels completely covering said compartment when the side panels are extended and providing an opening through which said top supporting means may project when the side panels are retracted.

References Cited in the file of this patent

UNITED STATES PATENTS

| | | |
|---|---|---|
| 1,071,348 | Rice | Aug. 26, 1913 |
| 1,448,981 | Summerscales | Mar. 20, 1923 |
| 1,796,918 | Bresee | Mar. 17, 1931 |
| 2,046,574 | Olivier | July 7, 1936 |
| 2,599,277 | Orr | July 3, 1952 |

FOREIGN PATENTS

| | | |
|---|---|---|
| 656,061 | France | Apr. 26, 1929 |
| 6,354 | Great Britain | 1912 |